United States Patent [19]

Ohta et al.

[11] Patent Number: 4,762,071

[45] Date of Patent: Aug. 9, 1988

[54] HOOD DEVICE FOR COUPLING CARS

[75] Inventors: Yoshio Ohta, Tokyo; Koji Tabata, Nagoya, both of Japan

[73] Assignees: Narita Seisakusho Mfg., Ltd., Nagoya; Japan National Railways, Tokyo, both of Japan

[21] Appl. No.: 934,904

[22] Filed: Nov. 25, 1986

[30] Foreign Application Priority Data

Nov. 26, 1985 [JP]  Japan ................. 60-265611

[51] Int. Cl.$^4$ .......................................... B61D 17/22
[52] U.S. Cl. ...................... 105/8.1; 105/15; 105/21
[58] Field of Search ............ 105/8.1, 8 R, 15–17, 105/19, 21; 280/403; 296/15

[56] References Cited

U.S. PATENT DOCUMENTS

| | | | |
|---|---|---|---|
| 453,782 | 6/1891 | Bissell | 105/21 |
| 2,217,599 | 10/1940 | Seel | 105/8.1 |
| 4,252,065 | 2/1981 | Bickel et al. | |
| 4,318,345 | 3/1982 | Kleim | 105/15 |

FOREIGN PATENT DOCUMENTS

| | | | |
|---|---|---|---|
| 206742 | 12/1986 | European Pat. Off. | 105/8.1 |
| 208436 | 1/1987 | European Pat. Off. | 105/16 |
| 1211076 | 1/1962 | Fed. Rep. of Germany | 280/403 |

*Primary Examiner*—Galen Barefoot
*Assistant Examiner*—Paul E. Salmon
*Attorney, Agent, or Firm*—Leydig, Voit & Mayer

[57] ABSTRACT

Disclosed is a car coupling hood device including a pair of hoods provided between a pair of car bodies to be coupled together, each of the hoods having one end secured to an adjacent car body, and an intermediate frame for coupling the other ends of the hoods together. The hood device incorporates a plate member coupled to the intermediate frame and provided in either the ceiling portion or the bottom portion of the hood device, or in both portions, and regulating means for preventing the movement of the plate member by the engagement therewith when both the car bodies are displaced relative to each other in the lateral direction thereof by more than a predetermined value.

4 Claims, 5 Drawing Sheets

HOOD DEVICE FOR COUPLING CARS

BACKGROUND OF THE INVENTION

1. Field of the Invention

The present invention relates to a car coupling hood device of the type which includes a pair of hoods provided between a pair of car bodies to be coupled together, each of the hoods having one end fixed to the adjacent car body, and an intermediate frame for coupling the other ends of the hoods.

2. Description of the Prior Art

It has heretofore been known that in a hood device for coupling cars provided in a coupling section between two car bodies forming part of a railway train, both ends of the device are respectively coupled to the end faces of the two car bodies to be coupled, and that components of the hood device are displaced in conformity with the relative displacement of the two car bodies, the displacement of the hood device not being limited even when the degree of displacement is unusual in extent. Such a hood device therefore suffers from the problem that the hoods of the hood device become damaged when a plate-like component or the like incorporated in the hood device is displaced by more than a predetermined degree with respect to the hoods and is pressed against them during the running of the train.

SUMMARY OF THE INVENTION

Accordingly, an object of the present invention is to provide a hood device for coupling cars which is improved in such a manner that its hoods do not get subjected to damage even when the relative displacement between a pair of car bodies becomes excessive, thereby overcoming the disadvantage of the prior art.

To achieve this object, the present invention provides a car coupling hood device having a pair of hoods provided between a pair of car bodies to be coupled together, each of the hoods having one end fixed to the adjacent car body, and an intermediate frame for coupling the other ends of the hoods, the hood device including a plate member coupled to the intermediate frame and provided in either the ceiling portion or the bottom portion of the hood device, or in both portions, and regulating means for preventing the movement of the plate member by engagement therewith when the pair of car bodies are subjected to relative displacement more than a predetermined amount.

Other objects, features and advantages of the invention will become clear from the following description of the preferred embodiment taken in conjunction with the accompanying drawings.

DESCRIPTION OF THE PREFERRED EMBODIMENT

Figure 6:
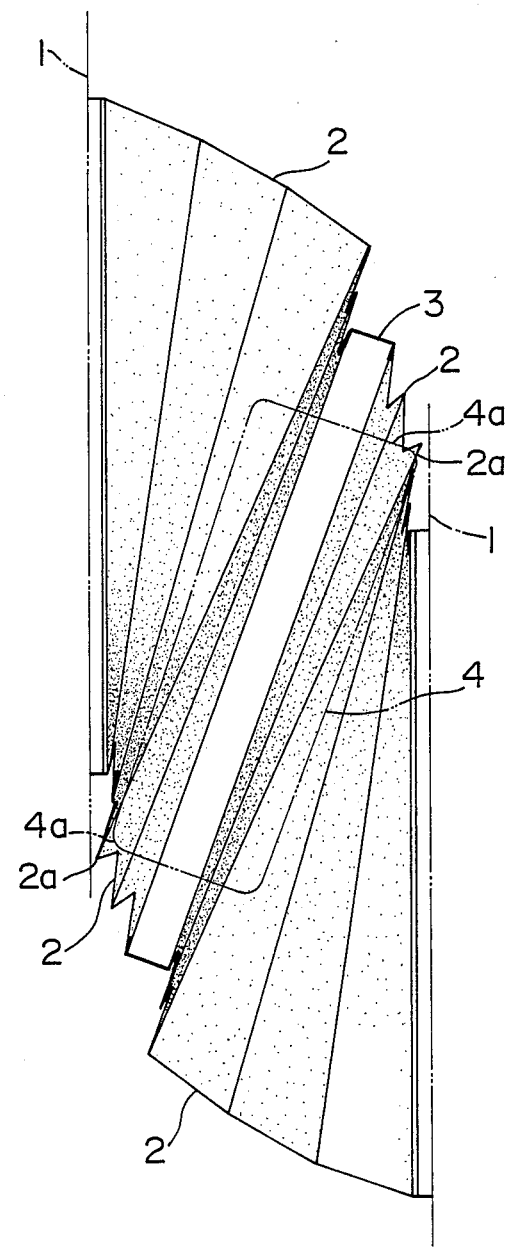
FIG. 6 is a plan view of a conventional hood device, illustrating a state in which the components thereof have been displaced relative to each other to an excessive degree.

In FIG. 6 which shows a conventional hood device, a pair of hoods 2 of the hood device for coupling car bodies 1, 1 are greatly displaced to the right and left in mutually opposite directions when the train negotiates an S-shaped curve on a railway line on which car bodies are displaced relative to each other to an excessive degree. Since this hood device has no way of regulating any abnormal displacement of the hood device components, when the intermediate frame 3 positioned between the hoods is slanted, both the hoods 2 are displaced in the manner shown in the drawing, and the portions thereof (2a) which are drawn toward the end faces of the car bodies make contact therewith and slide against them, thus damaging these portions of the hoods and reducing the effective life of the hood device.

An embodiment of the present invention will be hereinunder described with reference to FIGS. 1 to 5.

Figure 1:
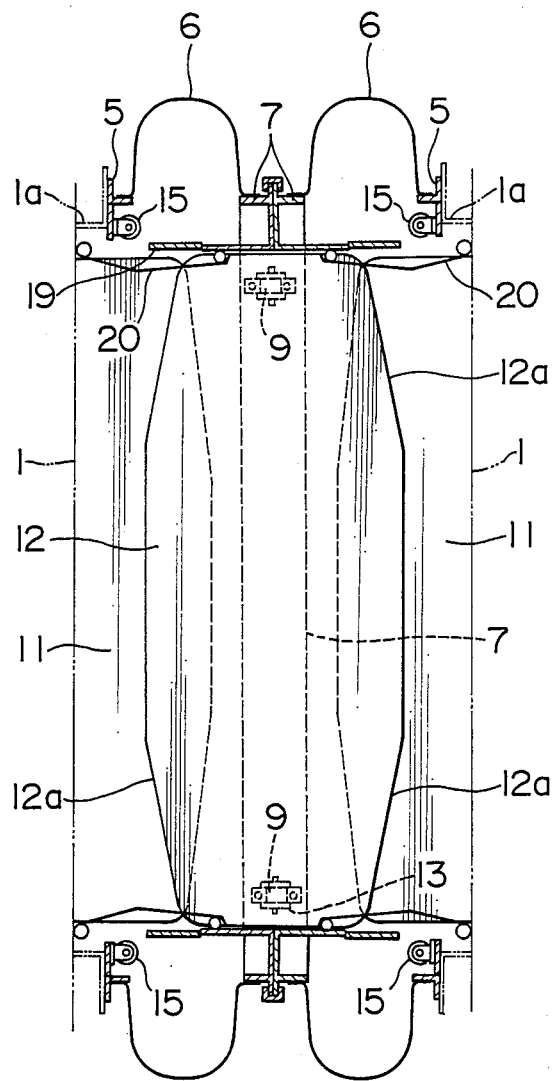
FIG. 1 is a sectional plan view of a hood device for coupling cars of the present invention.

In the drawings, a pair of coupled car bodies 1, 1 have opposing end faces, to which body side hood frames 5, 5 made of metal are secured through fixing frames 1a, 1a. The body side hood frames 5, 5 are rectangular in frontal configuration. A hood of the hood device is divided into two parts 6, 6 in the running direction of the car bodies. Body side ends 6a, 6a of these hoods are respectively secured to the hood frames 5, 5, while free side ends 6b, 6b thereof have free side hood frames 7, 7 also made of metal. Both of the free side hood frames 7, 7 of the hoods 6, 6 are adapted to abut against and be connected with each other by means of buckles, thereby constituting an intermediate frame, so that the coupling section between the two car bodies 1, 1 is covered by the two hoods 6, 6, as shown in FIG. 1. The free side hood frames 7, 7 are rectangular in frontal configuration. A balancing spring 8 for positioning the frames 7, 7 at the mid point of the gap between the car bodies 1, 1 is provided between the bottom portions of the frames 7, 7 and the body side hood frames 5,5. Brackets 9, 9 for supporting a floor plate are secured by means of bolts 10 on the right and left upper surfaces of the bottom portions of the metal frames 7, 7. The floor plate provided at the bottom portion of the hood device for coupling the car bodies 1, 1 comprises two body side floor plates 11, 11 mounted on the end faces of the two car bodies in such a manner that they remain in a horizontal state, and a central floor plate or a movable floor plate for connecting the intermediate portions of these body side floor plates 11,11. The central floor plate 12 has brackets 13, 13 on the lower surface thereof at positions corresponding to the brackets 9, 9 provided on the free side hood frames 7, 7. The two brackets 9 and 13 are turnably coupled by a horizontal rotating shaft 14, by means of which the front and rear ends of the central floor plate 12 are moved in the vertical direction. By coupling the central floor plate 12 to the free side hood frames 7, 7 at the right and left ends thereof, they move together while retaining their mutual relationship without relative displacement in the longitudinal or lateral direction of the car bodies. Reference numeral 15 designates a guide roller constituting a regulating member provided on the car body side hood frame 5. The guide roller 15 has a vertical shaft 15a around which it is turned. The guide roller 15 is positioned on a track on which the central floor plate 12 horizontally moves in the lateral direction, and protrudes further toward the center of the hood device than the body side end 6a of the hood 6. The body side hood frames 5, 5 each have right and left guide rollers 15. The front and rear ends of the right and left sides of the central floor plate 12 are tapered so that they may be easily engaged with the guide rollers 15. The hood device is divided into two parts; one which includes a hood coupled to one car body, and the other which includes a hood coupled to the other car body. Each part has a ceiling panel separated into a body side ceiling panel 16 and a hood side ceiling panel 17. The proximal end of the hood side ceiling panel 17 is secured to the lower surface of the upper portion of the free side hood frame 7, while the proximal end of the car body side ceiling panel 16 is supported on the end face of the car body 1 in such a manner that it is movable in the vertical direction, with the distal end thereof slidably supported over the hood ceiling panel 17. When both panels 17, 17 provided in two parts of the hood device which include the hoods 6, 6 are coupled to each other, they have the same configuration, as seen from above, as that of the central floor plate 12. The body side hood frame 5 is also provided with guide rollers 18 for engaging the hood side ceiling panel 17 which are similar to the guide rollers 15. The guide rollers 18 and the hood side ceiling panel 17 engage with each other in a manner similar to the way in which the guide rollers 15 engage with the central floor plate 12. Reference numerals 19 and 20 respectively denote a side wall fixed panel secured to the free side hood frame 7 and a side wall movable panel turnably mounted on the end face of the car body 1, the distal end thereof slidably abutting against the inner surface of the side wall fixed panel 19.

Figure 2:
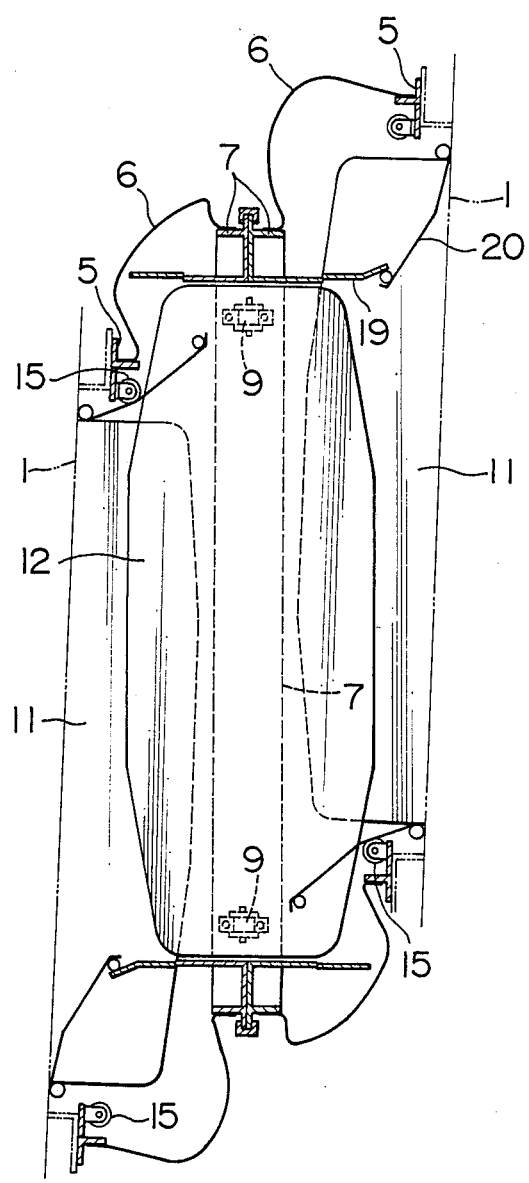
FIG. 2 is a sectional plan view of the embodiment of FIG. 1, showing a state in which a pair of car bodies have been displaced relative to each other to a large degree.
Figure 3:
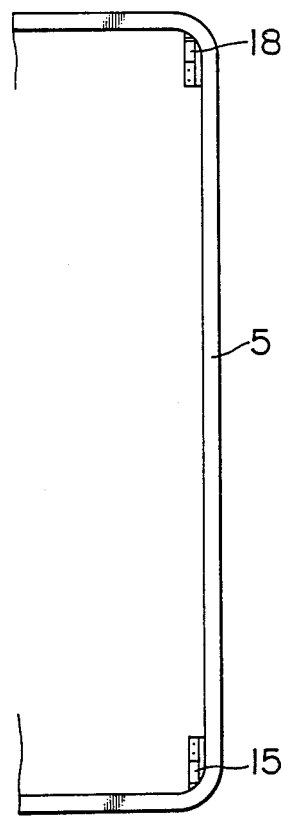
FIG. 3 is a front view of a body side hood frame, showing it in a state in which it has been provided with regulating members.
Figure 4:
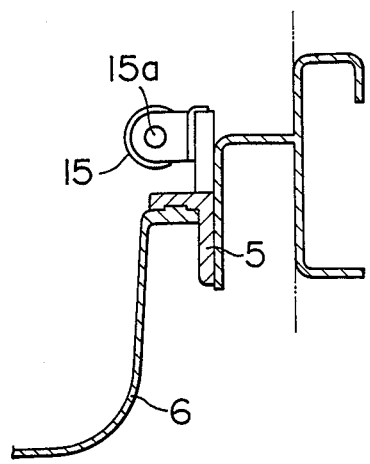
FIG. 4 is a plan view of a regulating member.
Figure 5:
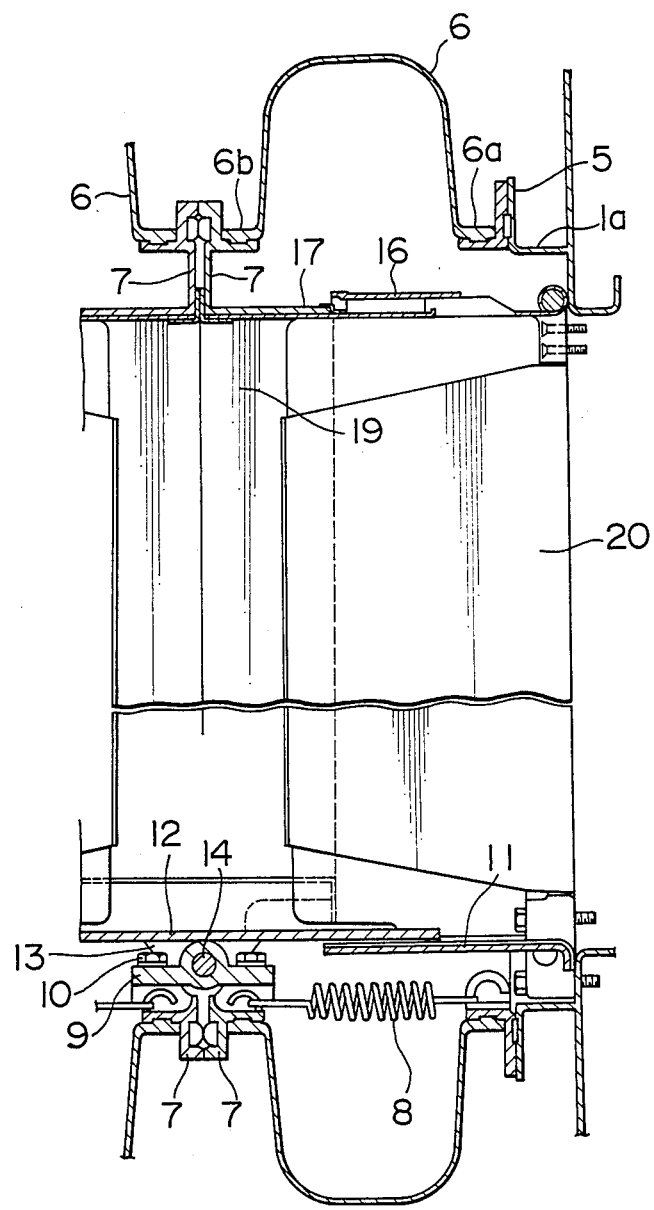
FIG. 5 is a sectional side view of the hood device for coupling cars of FIG. 1.

With the arrangement of the hood device being such as described above, when the car bodies 1,1 pass around an S-shaped curve, both ends of the hood device coupling the car bodies 1, 1 are displaced by an excessive degree in the opposing rightward and leftward directions. The central floor plate 12 constituting the movable floor plate is thereby displaced as shown in FIG. 2. At this time, the front and rear ends of the floor plate 12 are drawn toward and pass along the inner surfaces of the body side hood frames 5, 5, and then abut against the guide rollers 15 constituting the regulating member and are thereby regulated to ensure that the angle of planar deflection of the floor plate 12 is maintained below a predetermined value.

The hood side ceiling panels 17 are also regulated in a similar manner. As a result, the angle of deflection of the intermediate frame 7, 7 coupled to the floor plate 12 and the ceiling panels 17 is also regulated, thereby regulating the degree to which the hoods 6, 6 coupled to the intermediate frame 7, 7 are drawn toward the car bodies 1, 1. This prevents portions of the hoods 6, 6 drawn toward the end faces of the car bodies 1, 1 from abutting against the same, thereby preventing the hoods 6, 6 from being damaged as would occur with a conventional device.

In the above-described embodiment of the present invention, the hood side ceiling panel 17 constitutes a plate member provided at the ceiling portion of the hood device while the central floor plate 12 constitutes a plate member provided at the bottom of the hood device. The hood side ceiling panel 17 and the central floor plate 12 are both coupled to the intermediate frame 7, and the angle of deflection thereof is regulated by regulating the angles of deflection of the two members 17 and 12. The angle of deflection of the intermediate frame 7, 7 may also be regulated by regulating either one of the plate members. It is to be understood that this regulation can be performed by providing a plate member coupled to the intermediate frame 7, 7 on either the ceiling portion or the bottom portion of the hood device, or on both, and by regulating the displacement or the angle of deflection thereof.

The regulating member is constituted by a guide roller 15, 18 in the above embodiment. However, it may be a simple protrusion.

As is clear from the foregoing description, when the relative displacement of the car bodies 1, 1 is excessively large, the angle of planar deflection of the floor plate 12 or the ceiling panel 17 is regulated within a predetermined range according to the present invention, thereby regulating that of the intermediate frame 7, 7 coupled thereto. As a result, contact of the front and rear ends of the hoods 6, 6 with the end faces of the car bodies 1, 1 can be prevented. This enables the damage to the hoods 6, 6 caused thereby to be eliminated, increasing the economic life of the hood device. By regulating the angle of deflection of the floor plate 12 or the ceiling panels 17 in this way, it is also possible to prevent any of these members from making contact with the hoods 6, 6 when displaced to an excessive degree and hence the resulting damage thereto. This also acts to stabilize the floor plate 12 when it is displaced, thus decreasing the degree of disturbance experienced by passengers. In a type of hood device in which the side wall panels 19 are divided in the longitudinal direction, it is possible to prevent the divided side wall panels 19 from coming off when they are displaced to a large degree.

What is claimed is:

1. In a hood device for coupling cars, comprising a pair of hoods provided between a pair of car bodies to be coupled together, each of said hoods having a first end secured to an adjacent car body, and a second end including an intermediate frame for coupling said second ends of said hoods, an apparatus comprising:

a plate member having front and rear end edges coupled to said intermediate frame and provided in at least one of a ceiling and a bottom portion of said hood device, and regulating means for preventing the rotation of said plate member with respect to said pair of car bodies by engaging said plate member when said pair of car bodies are displaced relative to each other in the lateral direction thereof by more than a predetermined amount, said regulating means being provided on said pair of car bodies.

2. A hood device for coupling cars according to claim 1, wherein the bottom portion of said hood device has a pair of body side floor plates each having an end coupled to an adjacent car body, and a movable floor plate interposed therebetween, and said movable floor plate constitutes said plate member.

3. A hood device for coupling cars according to claim 1, wherein the ceiling portion of said hood device includes a pair of body side ceiling panels each having an end coupled to an adjacent car body, and a pair of hood side ceiling panels interposed between each of said body side ceiling panels and said intermediate frame, and said hood side ceiling panels constitute said plate member.

4. A hood device for coupling cars according to claim 1, wherein said regulating means comprises guiding members for guiding said plate member toward the center of said hood device by engaging with the front and rear end edges of said plate member when both of said car bodies are displaced relative to each other in the lateral direction by more than a predetermined amount.

* * * * *